United States Patent [19]
Hopmeyer

[11] Patent Number: 5,669,020
[45] Date of Patent: Sep. 16, 1997

[54] UNDERWATER CAMERA HOUSING HAVING INTERCHANGEABLE BACK MEMBERS TO ACCEPT STILL AND VIDEO CAMERAS

[76] Inventor: Stanley Hopmeyer, 764 Upper Belmont, Westmount, Quebec, Canada, H3Y 1K4

[21] Appl. No.: 504,706
[22] PCT Filed: Jan. 20, 1994
[86] PCT No.: PCT/CA94/00023
 § 371 Date: Nov. 2, 1995
 § 102(e) Date: Nov. 2, 1995
[87] PCT Pub. No.: WO94/17444
 PCT Pub. Date: Aug. 4, 1994

[30] Foreign Application Priority Data
Jan. 20, 1993 [CA] Canada ................................. 2087662

[51] Int. Cl.$^6$ .................... B65D 85/38; G03B 17/08; H04N 5/225
[52] U.S. Cl. .................... 396/27; 206/316.2; 348/81; 348/373
[58] Field of Search .................. 354/64; 348/81, 348/373, 376; D16/204, 208; 396/25, 27, 29; 206/216, 223, 578, 316.1, 316.2

[56] References Cited

U.S. PATENT DOCUMENTS 4,281,343 7/1981 Monteiro .......................... 354/64 X Primary Examiner—Safet Metjahic
Assistant Examiner—J. K. Han
Attorney, Agent, or Firm—Eric Fincham

[57] ABSTRACT

There is provided a camera housing system which may be used in hostile environments such as underwater and which system can be utilized for both still cameras and video cameras. The system is a three part system with a common front member and interchangeable back members with suitable controls mounted for operation of respective still camera and video camera. The front member includes a frame and lens and a common locking assembly to receive either of the interchangeable back members.

6 Claims, 3 Drawing Sheets

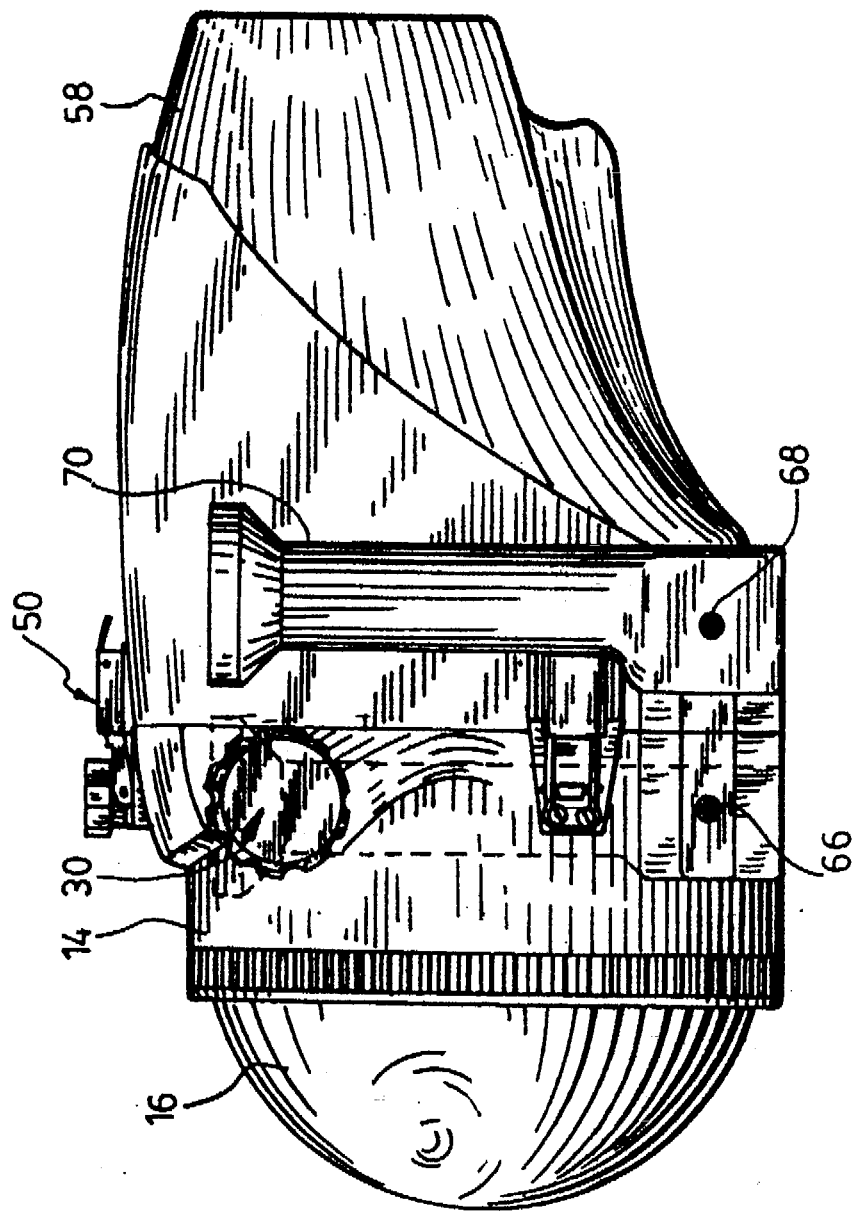

UNDERWATER CAMERA HOUSING HAVING INTERCHANGEABLE BACK MEMBERS TO ACCEPT STILL AND VIDEO CAMERAS

BACKGROUND OF THE INVENTION

The present invention relates to camera housing systems and more particularly, it relates to a camera housing system which can be utilized for both still cameras and video cameras.

The use of cameras in an underwater or other hostile environment is well know in the art. Thus, cameras are widely used by many divers for taking photographs and/or videos and there presently exists on the market a number of housings adapted to protectively enclose the cameras. These housings fall into two categories—housings for still cameras (generally 35 mm cameras) and housings for video cameras (generally 8 mm; VHS or Beta formats). Each camera housing normally is designed for a specific model of camera.

It is occurring with increasing frequency that the people using these housings utilize both types of cameras (still and video) and accordingly, must purchase a separate housing for each type of camera. Not only does this create extra expense, it also creates problems when travelling with the equipment since this equipment tends to be somewhat bulky and heavy. However, since there are substantial differences between a video camera and a still camera, manufacturers have created completely different housings for the different types of cameras.

SUMMARY OF THE INVENTION

It is an object of the present invention to provide a camera housing system which is adaptable for both still and video cameras, and which minimizes the number of components which must be changed when converting from one format to the other format.

According to one aspect of the present invention, there is provided a camera housing system which is adaptable for both still cameras and video cameras. The system includes a front member which has a frame portion and a lens mounted in the frame portion. The front member has first cooperative locking means associated therewith. A first back member is adapted for use with a still camera and has associated therewith second cooperative locking means which are adapted to cooperatively engage with the locking means on the front member. A second back member is adapted to enclose a video camera and also includes cooperative locking means which are adapted to cooperatively engage with the locking means on the front member.

In greater detail, and as set forth above, the system utilizes a common front member with first and second interchangeable back members adapted to enclose a still camera and a video camera respectively. The system uses a common locking system such that the locking means on the front member can be cooperatively engaged with lock means on either of the back members. The engagement and sealing of the front and back members together may be accomplished in a known manner using "O" rings and the like. Locking systems can include, among others, a latch lock or a bolt lock means.

In preferred embodiments of the invention, the front member will have a frame portion with either flat or dome ports or lenses. The front member may also include a number of controls for the operation of the still camera. Naturally, the specific controls will depend on the model since some models of still cameras are substantially automated (focusing, exposure control, etc.) However, a number of the cameras are equipped with manual controls which are the preference of many photographers. In such an instance, a front member may have suitable controls for apertures and focus controls.

Other functions of the camera may be operated by controls placed on either the front member, which is common to both cameras or placed on the back member of the camera for still operation. These controls could include means for controlling shutter speed and/or film speed.

The front member also preferably includes means for mounting both the still camera and the video camera. Since both types of cameras commonly have a threaded aperture for mounting on tripods and the like, the system may include a single point of mounting with a suitable adaptor (for the different types of cameras). In other words, both cameras can be adapted for mounting to the front member and which mounting will therefor permit easy access to both the still and video cameras for replacement of the film or other image recording media.

The front member also preferably includes means for mounting a pair of handles thereon and to this end, a pair of conventional handles may be screw threadably or otherwise engaged with the frame portion of the front member. As is known in the art, the handle grips may include means for mounting flash systems or other accessories.

The back member for enclosing the video camera will preferably carry controls thereon for operation of the video camera. The number of controls my vary, but would typically include such functions as record, standby, zoom, manual or automatic focus, white balance, etc. One convenient manner of controlling the operation of the video camera will be by electromagnetic (HALL effect) controls. The controls would be interfaced with a suitable electronic card which may be incorporated in the back member.

Also, the back member for the video camera will also preferably carry means for mounting the handles in a manner similar to the front member. Thus, the handles may be disengaged from the front member, when using the video camera, and engaged with the back member to provide a better balance to the housing.

BRIEF DESCRIPTION OF THE DRAWINGS

Having thus generally described the invention, reference will be made to the accompanying drawings illustrating an embodiment thereof, in which:

FIG. 2a is a view similar to FIG. 2 illustrating modification of the system for a video camera;

DESCRIPTION OF PREFERRED EMBODIMENTS

Figure 3:
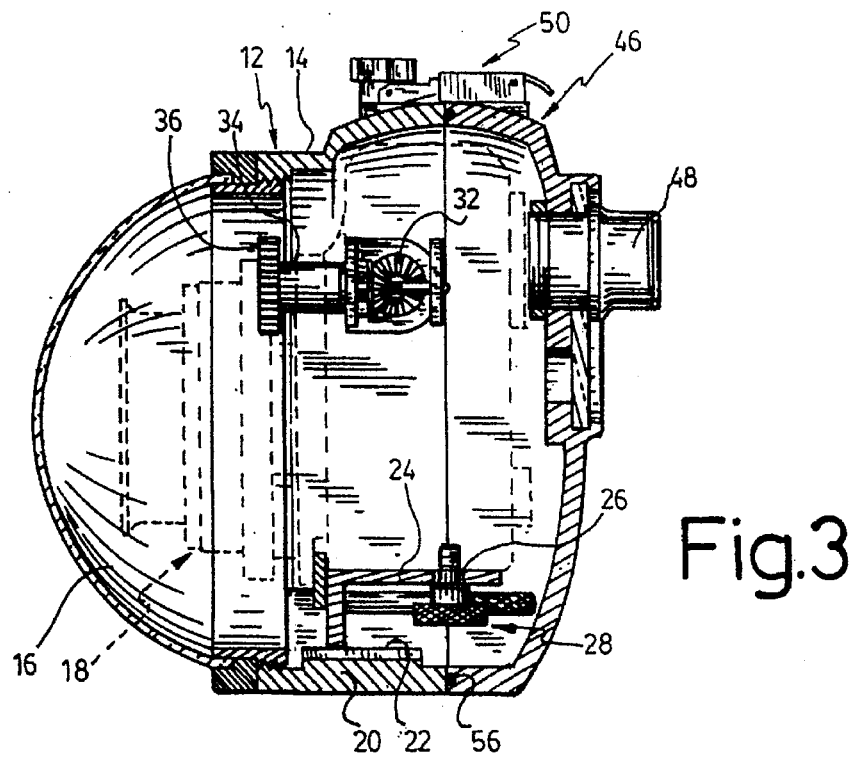
FIG. 3 is a side sectional view taken along the lines 3—3 of FIG. 1 illustrating the system in a still camera setup.

Referring to the drawings in greater detail and by reference characters thereto, the illustrated housing system includes a front member 12 comprised of a frame portion 14 having a lens 16 in the front thereof. A still camera 18 is shown in dotted lines in FIG. 3 to illustrate placement thereof. A bottom frame portion 20 has a plate member 22 secured thereto and an "L" shaped bracket 24 has a screw threaded aperture formed therein. A fastening screw 28 is adapted to be screw threadably engaged with camera 18 by means of a conventional aperture having screw threads formed therein in the bottom of the camera.

Front member 12, in the illustrated embodiment, carries certain controls for controlling the functions of the camera. Thus, a knob 30 is connected to a shaft (not shown) to turn bevel gear arrangement 32 and via shaft 34 to rotate ring gear 36. Ring gear 36 is, in turn, connected to the focusing ring of the camera 18.

Similarly, and in a conventional manner, aperture control 38 and shutter release 40 controls are provided on the exterior of the frame 12. These arrangements are conventional and accordingly are not illustrated in detail.

A first back member 46 operates with front member 12 to provide the complete housing about camera 18. As may be seen from the Figures, first back member 46 may include a viewing port 48 and is connected to front member 12 by a plurality of locking means generally designated by reference numeral 50.

Each locking means 50 can comprise a first latch member 52 on the front member and a second latch member 54 on first back member 46. An "O" ring 56 is designed to prevent entry of water to the interior of the camera.

Figure 1:
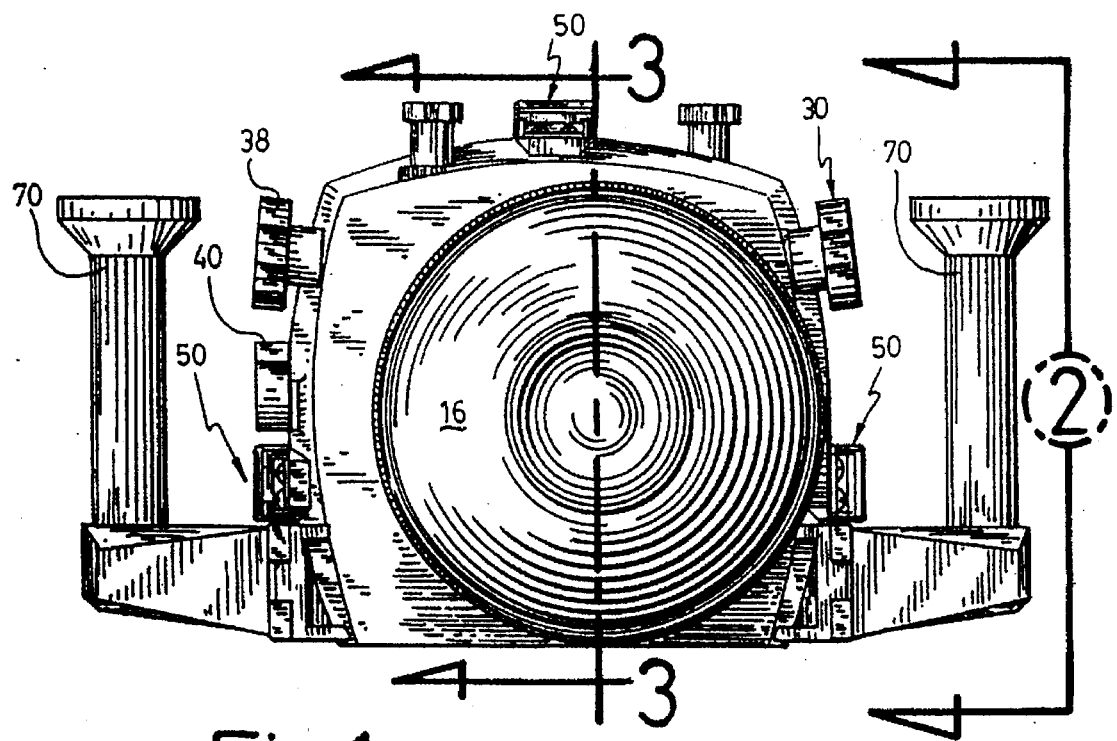
FIG. 1 is a front elevational view of a housing system adapted for still camera.
Figure 2:
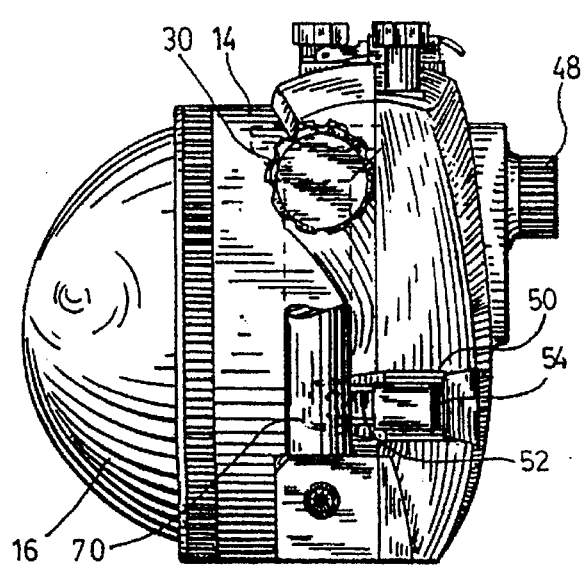
FIG. 2 is a side elevational view taken along the line 2 of FIG. 1.
Figure 3A:
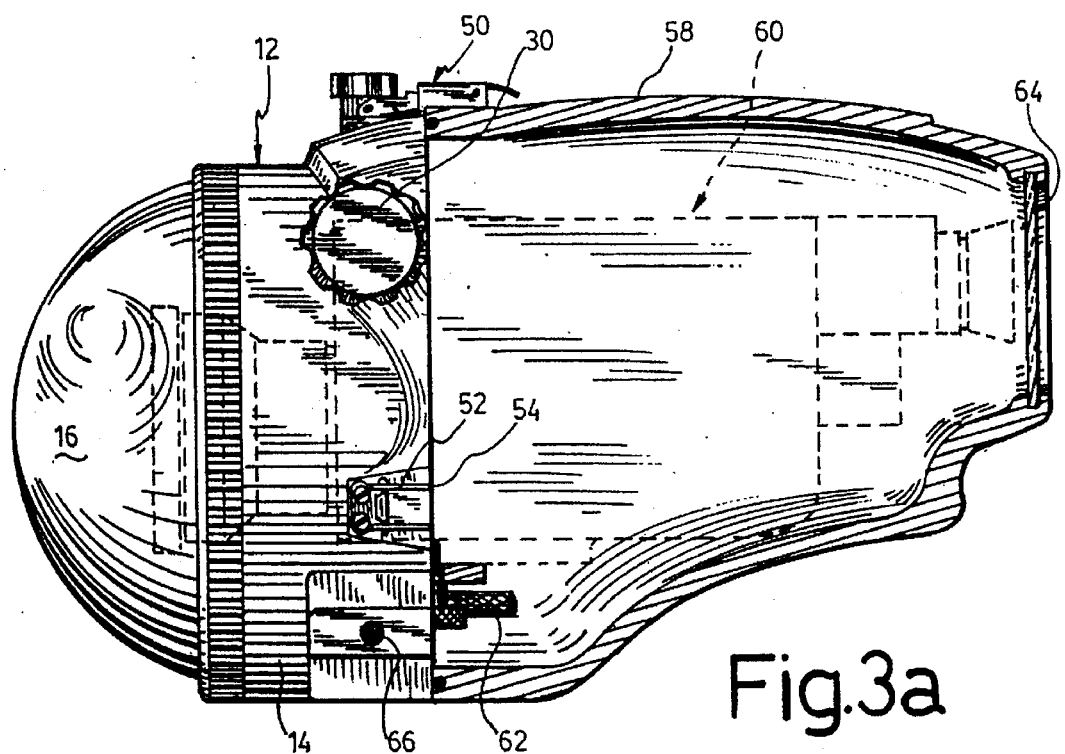
FIG. 3a is a view similar to FIG. 3 illustrating the system setup for a video camera.

The system includes a second back member illustrated in FIGS. 2a and 3a and generally designated by reference numeral 58. Back member 58 is adapted to enclose a video camera 60 (shown in dotted lines) and similar to the arrangement for the still camera, a mounting bracket 62 is provided to mount the camera in the front member 12. Mounting bracket 62 is designed for the particular form of camera and thus, different mounting brackets may be provided. Second back member 58 will include a viewing port 64. Suitable controls will be provided to operate the various camera functions and various means of doing so are known in the art. These controls (not shown) can be any suitable.

As may best be seen in FIG. 2a, front member 12 has apertures 66 formed on the side thereof and which apertures have screw threads formed interiorly thereon. Second back member 58 also has apertures 68 formed therein. Apertures 66 and 68 are adapted to receive handles 70 which, in the case of still camera operation, are mounted on front member 12 while, in the case of video camera operation, are mounted on back member 58.

It will be understood that the above described embodiments are for purposes of illustration only and that changes and modifications may be made thereto without departing from the spirit and scope of the invention.

I claim:

1. A camera housing system adaptable for still cameras and video cameras, the system comprising a front member having a frame portion, a lens mounted in said frame portion, cooperative locking means on said frame portion, a first back member adapted to enclose a still camera, said first back member having cooperative locking means associated therewith adapted to engage said locking means on said frame portion, a second back member adapted to enclose a video camera, said second back member having locking means adapted to cooperatively engage with said cooperative locking means on said frame portion.

2. The system of claim 1 wherein said locking means on said frame portion and each of said back members comprises a latch locking system.

3. The system of claim 1 wherein said front member carries controls for the focus and aperture control for a still camera.

4. The system of claim 3 wherein said front member also carries shutter release control means.

5. The system of claim 1, wherein each of said front member and said second back member has means associated therewith for mounting a pair of handles thereon.

6. The system of claim 1, wherein said front member includes mounting means adapted to mount both said video camera and said still camera.

* * * * *